(12) United States Patent
Seelenfreund et al.

(10) Patent No.: US 11,949,442 B2
(45) Date of Patent: Apr. 2, 2024

(54) MOBILE CONVERSION APPARATUS FOR DOCKING CELLULAR DATA DEVICES

(71) Applicant: Siyata Mobile Inc., Montreal (CA)

(72) Inventors: Marc Seelenfreund, Raanana (IL); Gidi Bracha, Cochav Yair (IL)

(73) Assignee: Siyata Mobile Inc., Montreal (CA)

( * ) Notice: Subject to any disclaimer, the term of this patent is extended or adjusted under 35 U.S.C. 154(b) by 0 days.

(21) Appl. No.: 17/682,731

(22) Filed: Feb. 28, 2022

(65) Prior Publication Data

US 2022/0399910 A1   Dec. 15, 2022

Related U.S. Application Data

(60) Provisional application No. 63/208,781, filed on Jun. 9, 2021.

(51) Int. Cl.
*H04B 1/08*    (2006.01)
*H04B 1/3827*    (2015.01)

(52) U.S. Cl.
CPC ........... *H04B 1/082* (2013.01); *H04B 1/3827* (2013.01)

(58) Field of Classification Search
CPC .............................. H04B 1/082; H04B 1/3827
See application file for complete search history.

(56) References Cited

U.S. PATENT DOCUMENTS

| | | | |
|---|---|---|---|
| 4,134,070 A * | 1/1979 | Henderson | H04B 1/38 455/90.3 |
| 4,892,486 A | 1/1990 | Guzik et al. | |
| 4,955,071 A | 9/1990 | Wong et al. | |
| 5,363,030 A | 11/1994 | Ford et al. | |
| 5,418,836 A * | 5/1995 | Yazaki | H04M 1/6083 379/446 |
| D361,769 S | 8/1995 | Richards et al. | |
| 5,438,685 A * | 8/1995 | Sorensen | H04B 1/3877 361/814 |

(Continued)

FOREIGN PATENT DOCUMENTS

| | | |
|---|---|---|
| EP | 2474880 A2 | 7/2012 |
| GB | 2336477 A | 10/1999 |

(Continued)

OTHER PUBLICATIONS

Motorola, "Saber Vehicle Adapter Instruction Manual", Manual No. 68P81058C70-O, 1989.

(Continued)

*Primary Examiner* — Jinsong Hu
*Assistant Examiner* — Rui M Hu
(74) *Attorney, Agent, or Firm* — Henry B. Ward, III

(57) ABSTRACT

A mobile conversion apparatus for docking cellular data devices including push-to-talk over cellular (PoC) devices. The apparatus includes a Universal Serial Bus Type-C (USB-C) connection. The conversion apparatus is designed and configured to couple the PoC device to a mobile communications interface within a vehicle using the USB-C connection. The PoC device is horizontally insertable into the conversion apparatus exposing only the top of the PoC device leaving only the display and knob of the PoC device exposed on the face of the conversion apparatus. In this manner, the conversion apparatus effectively docks the PoC device, thereby connecting the two together via the USB-C connection.

12 Claims, 13 Drawing Sheets

(56) References Cited

U.S. PATENT DOCUMENTS

| | | | | |
|---|---|---|---|---|
| 5,537,673 A * | 7/1996 | Nagashima | ......... | H04M 1/6075 455/74 |
| 5,627,891 A * | 5/1997 | Gallagher | ......... | B60R 11/0241 379/454 |
| 5,774,793 A * | 6/1998 | Cooper | ......... | H04W 88/02 455/418 |
| 5,797,088 A * | 8/1998 | Stamegna | ......... | H04M 1/6075 455/345 |
| 5,974,333 A * | 10/1999 | Chen | ......... | B60R 11/0241 455/346 |
| 6,016,432 A * | 1/2000 | Stein | ......... | H04M 1/0254 |
| 6,131,042 A * | 10/2000 | Lee | ......... | H04B 1/3805 455/345 |
| 6,160,997 A * | 12/2000 | Oberlaender | ......... | H04M 1/2748 379/110.01 |
| 6,191,943 B1 * | 2/2001 | Tracy | ......... | G06F 1/203 361/679.55 |
| 6,226,497 B1 * | 5/2001 | Guntzer | ......... | B60R 11/0241 455/66.1 |
| 6,230,029 B1 * | 5/2001 | Hahn | ......... | H04M 1/6091 379/430 |
| 6,304,764 B1 * | 10/2001 | Pan | ......... | H04M 1/6083 455/557 |
| 6,542,758 B1 * | 4/2003 | Chennakeshu | ......... | B60R 11/0241 455/575.9 |
| 6,718,187 B1 * | 4/2004 | Takagi | ......... | G02B 27/01 455/563 |
| 6,785,531 B2 * | 8/2004 | Lepley | ......... | H04B 1/3838 455/351 |
| 6,963,743 B1 * | 11/2005 | James | ......... | H04M 1/6083 455/66.1 |
| 7,831,756 B1 * | 11/2010 | Fils | ......... | H04B 1/082 710/303 |
| 7,931,505 B2 * | 4/2011 | Howard | ......... | B60R 11/02 361/679.55 |
| 8,578,081 B1 * | 11/2013 | Fils | ......... | G06F 1/16 710/72 |
| 8,688,168 B2 * | 4/2014 | Elter | ......... | H04M 1/2535 705/50 |
| 9,124,331 B2 * | 9/2015 | Iwade | ......... | H04B 1/082 |
| 9,848,311 B1 * | 12/2017 | Grier | ......... | H04W 16/26 |
| 10,245,097 B2 | 4/2019 | Honda et al. | | |
| 11,044,115 B1 * | 6/2021 | Lee | ......... | H02H 3/10 |
| 11,300,331 B2 * | 4/2022 | Choi | ......... | F25D 11/00 |
| 2002/0038550 A1 | 4/2002 | Gillen | | |
| 2003/0115892 A1 * | 6/2003 | Fu | ......... | F25D 25/021 62/3.6 |
| 2004/0051497 A1 * | 3/2004 | Richards | ......... | H02J 7/0024 320/103 |
| 2005/0068733 A1 * | 3/2005 | Squillante | ......... | G06F 1/181 361/679.47 |
| 2007/0021148 A1 * | 1/2007 | Mahini | ......... | H04M 1/72409 455/575.1 |
| 2007/0255114 A1 * | 11/2007 | Ackermann | ......... | G06F 8/65 600/300 |
| 2008/0006036 A1 * | 1/2008 | Askew | ......... | F24F 5/0042 62/3.5 |
| 2008/0041066 A1 * | 2/2008 | Luo | ......... | F24F 5/0042 62/430 |
| 2008/0158790 A1 * | 7/2008 | Itoh | ......... | H04B 1/082 361/679.02 |
| 2009/0318185 A1 * | 12/2009 | Lee | ......... | H04M 1/72409 455/550.1 |
| 2010/0253535 A1 * | 10/2010 | Thomas | ......... | H04B 1/082 340/4.37 |
| 2011/0053549 A1 * | 3/2011 | Lai | ......... | B60R 11/02 381/86 |
| 2011/0145466 A1 * | 6/2011 | Supran | ......... | G06F 1/1626 710/304 |
| 2011/0242499 A1 * | 10/2011 | Terao | ......... | G03B 21/16 353/57 |
| 2011/0286608 A1 * | 11/2011 | Hautier | ......... | H04R 5/04 381/74 |
| 2012/0192574 A1 * | 8/2012 | Ghoshal | ......... | F25B 21/02 62/3.2 |
| 2013/0225096 A1 * | 8/2013 | Elter | ......... | H04M 1/04 455/74.1 |
| 2013/0337859 A1 * | 12/2013 | Patel | ......... | H04W 4/10 455/575.8 |
| 2014/0260330 A1 * | 9/2014 | Karlstedt | ......... | F25B 21/02 62/3.3 |
| 2017/0172542 A1 * | 6/2017 | Lee | ......... | A61B 8/546 |
| 2017/0185112 A1 * | 6/2017 | Magi | ......... | G06F 1/20 |
| 2018/0004259 A1 | 1/2018 | Kulkarni et al. | | |
| 2018/0287652 A1 * | 10/2018 | Morse | ......... | H04B 1/3833 |
| 2019/0024953 A1 * | 1/2019 | Thao | ......... | H05K 7/20009 |
| 2019/0387368 A1 * | 12/2019 | Sachs | ......... | H04W 88/02 |
| 2020/0080762 A1 * | 3/2020 | Fisher | ......... | F25D 19/00 |
| 2020/0288280 A1 * | 9/2020 | Morse | ......... | H04L 5/16 |
| 2021/0081001 A1 * | 3/2021 | Huang | ......... | G06F 1/1626 |
| 2023/0275288 A1 * | 8/2023 | Choe | ......... | H01M 10/6572 429/62 |

FOREIGN PATENT DOCUMENTS

| | | |
|---|---|---|
| GB | 2420930 A | 6/2006 |
| KR | 101390352 B1 | 4/2014 |
| WO | 2013188704 A1 | 12/2013 |

OTHER PUBLICATIONS

Extended European Search Report issued by the European Patent Office for European Patent Application No. 22159114.2, dated Aug. 22, 2022.

* cited by examiner

MOBILE CONVERSION APPARATUS FOR DOCKING CELLULAR DATA DEVICES

CROSS-REFERENCE TO RELATED APPLICATION

This application is a non-provisional patent application which claims the benefit of U.S. Provisional Application No. 63/208,781 filed Jun. 9, 2021, the entirety of which is incorporated herein by reference.

TECHNICAL FIELD

The present invention relates to converters. More specifically this invention relates to a conversion apparatus used to couple a portable cellular device to a mobile communications interface within a vehicle.

BACKGROUND

Portable radios devices are well in the communications art. Moreover, networks of portable cellular data devices such as a cellular push-to-talk (PTT) radio are known, and which enable users to communicate anywhere throughout the network. The networks may be limited to a particular closed setting such as the confines of a business premises. However, with the omnipresent Internet, the networks may be much broader (e.g., city-wide, country-wide, or global). Thus, communication across the entire globe is possible utilizing push-to-talk over cellular (PoC) which enables reliable communication across entire jurisdictions. PoC systems are used for transportation/trucking companies, border patrol, events, construction, and beyond.

The benefits of PoC systems include no costly infrastructure needed versus traditional radios that require costly infrastructure (such as repeaters) to be able to communicate over a large distance. PoC systems are also license-free which eliminates costly frequency licence fees. In addition, PoC systems often incorporate hands-free communication whereby users may safely communicate on the road via a speaker microphone, thus avoiding the liabilities associated with distracted driving.

In terms of the use of PoC systems within fleets of vehicles, these systems often rely upon a dedicated mobile radio unit that effectively functions as a mobile base station. Such dedicated mobile radio units are designed to be permanently mounted within a vehicle and to duplicate all functions of a portable PoC radio unit. However, in the general art of radio devices, there have been attempts to provide charging stations within a vehicle whereby a portable radio may be secured within a cradle to thereby charge the portable radio. Yet further, the cradle may provide other peripheral features such as an external microphone, speaker, and antenna. One such prior art cradle is the Saber™ Vehicular Adapter manufactured by Motorola, Inc.

Another prior art device exists in U.S. Pat. No. 4,892,486 that disclosed a vehicular adaptor for a portable communications device, such as a cellular telephone, pager, or two-way radio, which includes a connector that aligns itself to a mating connector on the communication device. The connector permits spatial alignment of electrical contacts in the connector with electrical contacts in the communications device. A corrugated spring mounting clamp and a locating nest on the connector permit the alignment of connections.

Another prior art device exists in U.S. Pat. No. 4,955,071 that disclosed a converter console for converting a portable radio to mobile operation, a sleeve for receiving the portable radio and improved mounting apparatus which positions the sleeve so the portable can be easily inserted and smoothly moves the sleeve into a loaded position in which the portable is connected for control by the console and for receiving power from the vehicle. The mounting apparatus holds the various contacts firmly together to prevent contact chatter. Also included are locking apparatus that prevent relative movement between the portable/sleeve and the housing to eliminate contact chatter under extreme vibration and, additionally, reduce theft and improper use.

Another prior art device exists in United Kingdom Patent Application Pub. No. GB 2,420,930 that disclosed an extension accessory for use with a mobile radio telephone in a vehicle is connectible to the radio telephone to provide auxiliary input and output audio transducers for speech input and output by a user. The extension accessory comprises a handset which may include a PTT switch as well as a microphone and speaker. A magnetic reed switch is used to detect the position of the accessory handset on a holder or cradle. Another cradle or holder couples the mobile radio telephone to an auxiliary antenna. Also described is a kit which includes the mobile radio telephone and the extension accessory and a method of using the kit to provide radio communication.

Based on the above, there is therefore a need for systems and/or methods that leverage the advantages of PoC systems while mitigating the various drawbacks of the prior art.

SUMMARY

The present invention provides a mobile conversion apparatus for docking cellular data devices. The conversion apparatus is designed and configured to couple a portable cellular device to a mobile communications interface within a vehicle.

The present invention includes a mobile conversion apparatus for docking cellular data devices including push-to-talk over cellular (PoC) devices. The apparatus includes a Universal Serial Bus Type-C (USB-C) connection. The conversion apparatus is designed and configured to couple the PoC device to a mobile communications interface within a vehicle using the USB-C connection. The PoC device is horizontally insertable into the conversion apparatus, exposing only the top of the PoC device and only leaving the display and knob of the PoC device exposed on the face of the conversion apparatus. In this manner, the conversion apparatus effectively docks the PoC device, thereby connecting the two together via the USB-C connection.

In a first aspect, the present invention provides a conversion apparatus for receiving a cellular data device, said apparatus comprising: an enclosure; an opening within said enclosure, said opening configured to accept therein said cellular data device; a a plurality of ports for interfacing said cellular data device with at least one accessory; and circuitry located within said enclosure and enabling said cellular data device to transfer data between a cellular network and at least one of said plurality of output ports.

In another aspect, the present invention provides an active cooling mechanism to control overheating within the enclosure of the conversion apparatus. The active cooling mechanism may include a thermoelectric cooling pad.

BRIEF DESCRIPTION OF THE DRAWINGS

The present invention will now be described by reference to the following figures, in which identical reference numerals refer to identical elements and in which.

DETAILED DESCRIPTION

The present invention provides a mobile conversion apparatus for docking cellular data devices including PoC devices. PoC devices, in accordance with the present invention, are PTT radio devices operating within a cellular network that are capable of providing data connections via standard Internet Protocol (IP). The PoC devices intended for use with the present invention are preferably those that include a Universal Serial Bus Type-C (USB-C) connection. The conversion apparatus is designed and configured to couple the PoC device to a mobile communications interface within a vehicle using the USB-C connection. The PoC device is horizontally insertable into the conversion apparatus exposing only the top of the PoC device, leaving only the display and knob of the PoC device exposed on the face of the conversion apparatus. In this manner, the conversion apparatus effectively docks the PoC device, thus connecting the two together via the USB-C connection.

Figure 1:
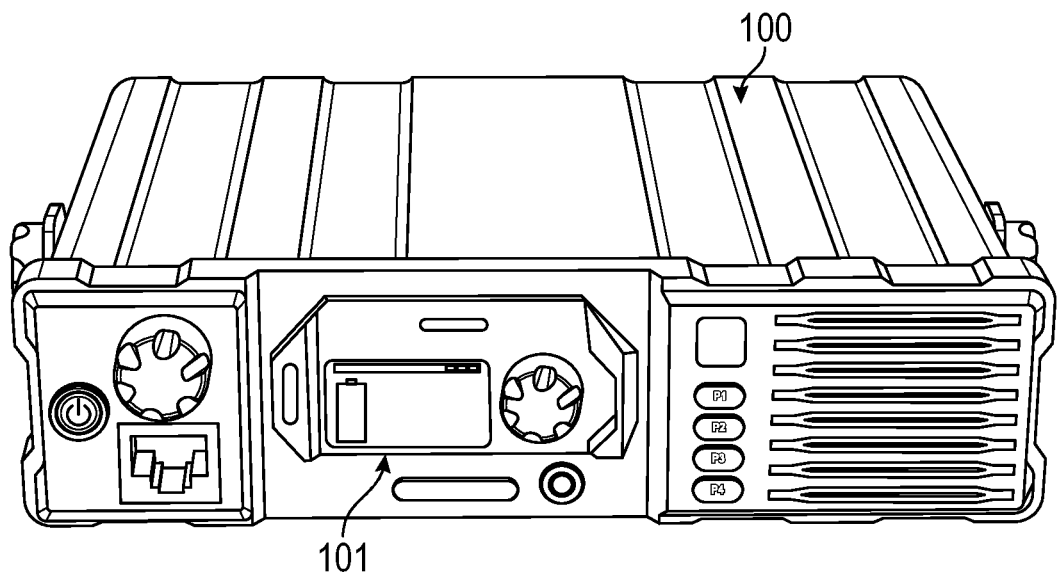
FIG. 1 is front perspective view of a conversion apparatus in accordance with the present invention incorporating a PoC device.

With reference to FIG. 1, there is shown a front perspective view of a conversion apparatus 100 in accordance with one implementation of one aspect of the present invention and which incorporates a PoC device 101. Here, the horizontal orientation of the PoC device 101 inserted within the conversion apparatus is shown such that a user viewing the conversion apparatus 100 would consider the two separate parts to be a uniformly integrated unit. This aspect of the present invention has the advantage that a high level of visual integration is provided by incorporating the PoC device 101 entirely within the conversion apparatus 100 with only the top-most surface of the PoC device 101 remaining flush with the viewable faceplate of the conversion apparatus 100. As should be clear, illustrated and described in this document is simply one implementation of many possible implementations of the various aspects of the present invention.

Figure 2:
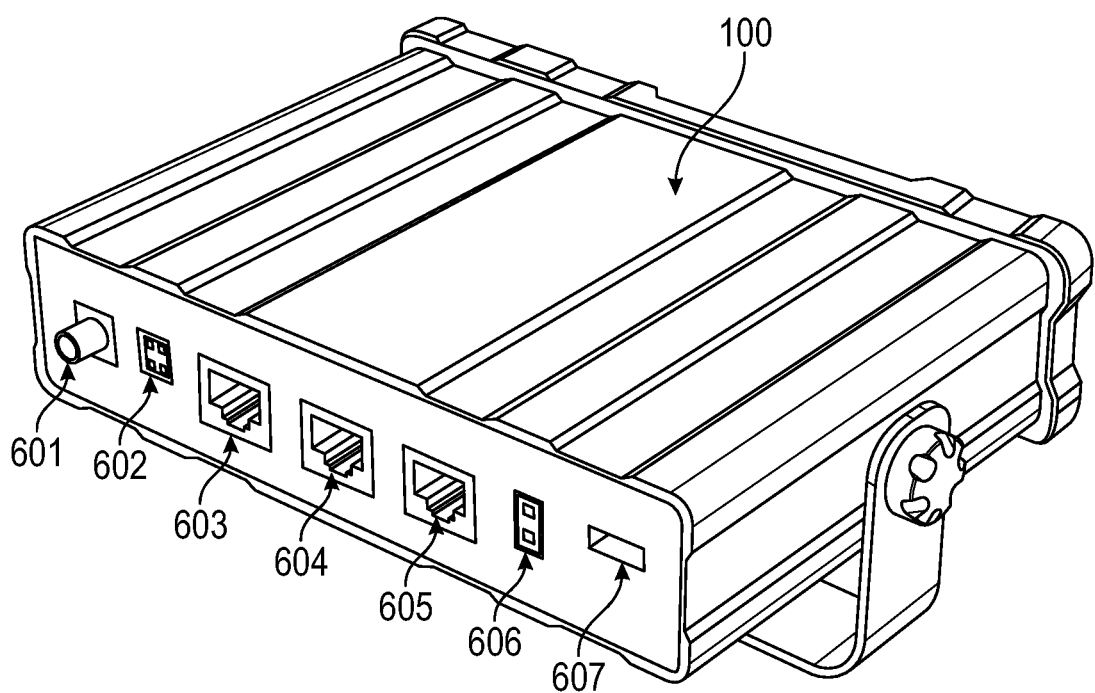
FIG. 2 is rear perspective view of the conversion apparatus in accordance with the present invention.

With reference to FIG. 2 there is shown a rear perspective view of the conversion apparatus 100 in accordance with one implementation of the present invention. Advantageously, this implementation of the conversion apparatus 100 includes a series of ports which allow the conversion apparatus 100 to connect to a variety of in-vehicle elements. It should be understood that the USB-C connection (further described hereinbelow with reference to FIG. 11) between the conversion apparatus and the PoC device enables functionality of each of the ports.

The ports shown include an antenna port 601 for coupling the antenna of the PoC device to an external antenna (e.g., roof-mounted vehicle antenna) to act as a booster and to thereby improve the cellular signal to the PoC device. Such an antenna port 601 is preferably of the FAKRA (D code) connector type that provides a high-quality radio frequency connection point. This type of connector also allows for possible insertion of an in-line signal booster (not shown) between the antenna port 601 and an external antenna. Other types of antenna ports are, of course, possible and may be used in other implementations.

The ports shown in FIG. 2 also include a power connection port 602. The power connection port 602 is preferably a four-pin type connector that allows for 12V/24V power. Onboard electronics within the conversion apparatus 100 is configured to provide for sensing the vehicle ignition and muting the radio through the power connection port 602. Other types of power connectors may also be used with this or other implementations of the present invention.

The ports shown in FIG. 2 also include a remote speaker microphone (RSM) connection port 603. The RSM port 603 located in the rear of the conversion apparatus 100 is a type RJ45 jack that is intended for connecting the existing speaker/microphone capabilities of the vehicle with the PoC device 101. An additional similar RSM port is provided on the front faceplate of the conversion apparatus (as will be discussed further with regard to FIG. 3 below) for a palm microphone.

The ports shown in FIG. 2 also include a privacy handset connection port 604. The privacy connection port 604 is a type RJ50 jack and may be utilized for a privacy headset connection (not shown) that also includes a PTT button allowing a user to make a private PTT call. Other types of jacks for use with other types of connection ports may also be used for this and other implementations of the present invention.

The ports shown in FIG. 2 also include a network interface port 605 (e.g. an Ethernet port). The network interface port 605 supplies a network connection (e.g. an Internet connection) from the PoC device to other IP devices located in the vehicle such as, but not limited to, an external laptop, digital video record (DVR) systems, or the like through the cellular data connection of the PoC device. This arrangement has the advantage of enabling robust tethering of network connectivity (e.g. Internet connectivity) to a vehicle in a quick and easy manner, and without any need for any additional wireless modem mechanisms.

The ports shown in FIG. 2 also include a two-pin speaker port 606. The speaker port 606 is provided for a user to optionally utilize an additional external speaker for audio output in any location convenient to the user such as, but not limited to, an external speaker placed more efficiently near a driver's head.

The ports shown in FIG. 2 also include a connection port 607 (e.g. a USB port). The connection port 607 located on the rear of the conversion apparatus 100 may be used as a USB On-The-Go (OTG) connection thereby enabling the PoC device to act as a host, allowing other USB devices, such as USB flash drives, digital cameras, mouse or keyboards, to be attached. It should be clear that the USB port may use any number of possible USB port implementations. As such, the USB port may be a USB-A, USB-B, or USB-C port. For greater compatibility with current and future equipment, a USB-C port may be used. As an alternative, multiple USB ports may be present on the conversion apparatus.

Figure 3:
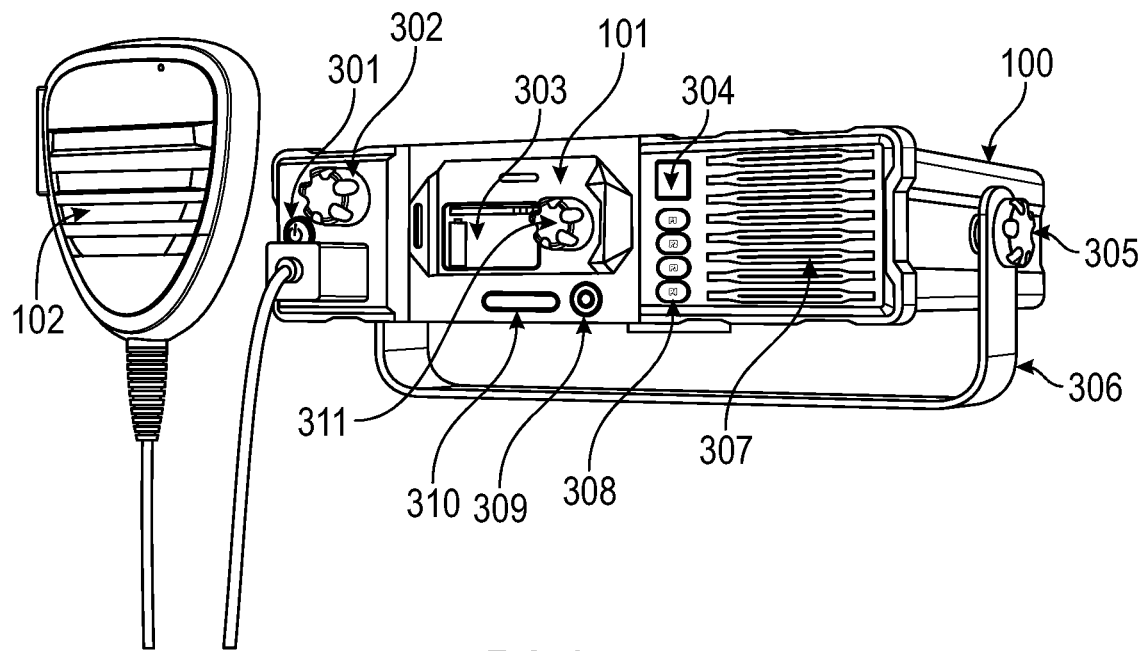
FIG. 3 is the conversion apparatus as shown in FIG. 1 and with an external microphone attached.

With reference to FIG. 3, the conversion apparatus 100 with a PoC device 101 inserted therein is shown in a manner similar to FIG. 1 but with an external palm microphone 102 attached to a front facing RSM port (not visible). As shown, the PoC device 101 is advantageously recessed into the front faceplate of the conversion apparatus 100 such that the top of the PoC device 101 is substantially flush with the planar surface of the faceplate. This enables the top of the PoC device 101 which may include a screen 303 and a volume/channel knob 311 to be visible to a user. The faceplate of the conversion apparatus 100 further includes a rotary knob 302 for volume/channel selection. The internal electronics of the conversion apparatus 100 are configured to enable the rotary knob 302 to act as volume or channel selection based on what the knob 311 of the PoC device 101 does. For example, this means that if the PoC device's knob 311 is set to volume control, then the rotary knob 302 will act as channel selection, and vice versa. This volume/channel functionality provides an efficient use of the controls of the front faceplate while providing a user-friendly interface.

It should be clear that it is preferable that the PoC device and the conversion apparatus be each configured to specifically operate and match one another. For such implementations, as shown in the figures, the conversion apparatus would be specifically configured to accommodate a specific model and make of a PoC device. However, in some implementations, the conversion apparatus may be generic in design and configuration so as to accommodate multiple different models of PoC devices. Depending on the configuration of the conversion apparatus and on the capabilities of specific models of PoC devices, the conversion apparatus may have a feature set that is different (or smaller than) than the feature set described in this document.

Returning to FIG. 3, the faceplate of the conversion apparatus 100 also includes a power button 301 allowing powering on and off the conversion apparatus 100. In one implementation, the power button engages/disengages the power circuitry for the conversion apparatus. The location of the power button 301 is arranged such that inadvertent engagement by the user is avoided. The faceplate of the conversion apparatus 100 also includes four programmable function keys 308. While four are shown in accordance with the present invention, it should be understood that there may be more or less such keys. However, four are preferred such that the faceplate remains uncluttered and user-friendly. The function keys 308 may be used for specific group or channel assignments predetermined and programmable by the user.

In other implementations of the present invention, the function keys may have predetermined and fixed functions or their functions may be user programmable as necessary. Of course, in other implementations, such function keys may be omitted.

The faceplate of the conversion apparatus 100 also includes an SOS button 304 for emergency broadcast by a user. The SOS button 304 is preferably enlarged and is brightly colored in order to avoid any confusion by the user. Internal electronics may be programmed, for example, such that the SOS button 304 engages a geolocating capability of the PoC device 101 and/or makes an automated call to a central dispatch or emergency services (e.g., "911" systems). The faceplate also includes a grill 307 under which an audio speaker is provided. It should be understood that the speaker is intended for basic operation under low noise conditions such that a user may wish to utilize an external speaker and/or headset as previously described. It should also be clear that, while an SOS button is useful, other implementations of the present invention may omit such a feature.

The faceplate of the conversion apparatus 100 also includes a locking mechanism 309 which the user may optionally engage to secure the PoC device 101 within the conversion apparatus 100. If the locking mechanism 309 is engaged and thus the PoC device 101 is locked into place, the user is precluded from ejecting the PoC device 101 from its position within the conversion apparatus 100. Ejecting the PoC device 101 from its position is accomplished by an eject button 310 placed on the faceplate below the PoC device 101. By locking the PoC device 101 in place via the locking mechanism 309, inadvertent release of the PoC device may be advantageously avoided. It should be clear that there are many mechanisms by which the locking mechanism may be implemented. Provided and described below is one exemplary example of such a locking mechanism and nothing in this document should be taken as limiting the scope of such a mechanism to only that which is described herein.

With further reference to FIG. 3, the embodiment of the present invention is shown in a configuration utilizing a mounting bracket 306. The flat bottom edge of the mounting bracket may be screwed or riveted into place onto any suitable flat surface inside the vehicle in which the invention is used. The positional angle of the conversion apparatus 100 may be adjusted by the user via two mounting tighteners 305 (one visible) which serve to affix the conversion apparatus 100 within the mounting bracket 306. The mounting tighteners 305 may be loosened and tightened as necessary to allow rotation of the conversion apparatus relative to the mounting bracket 306.

Figure 4:
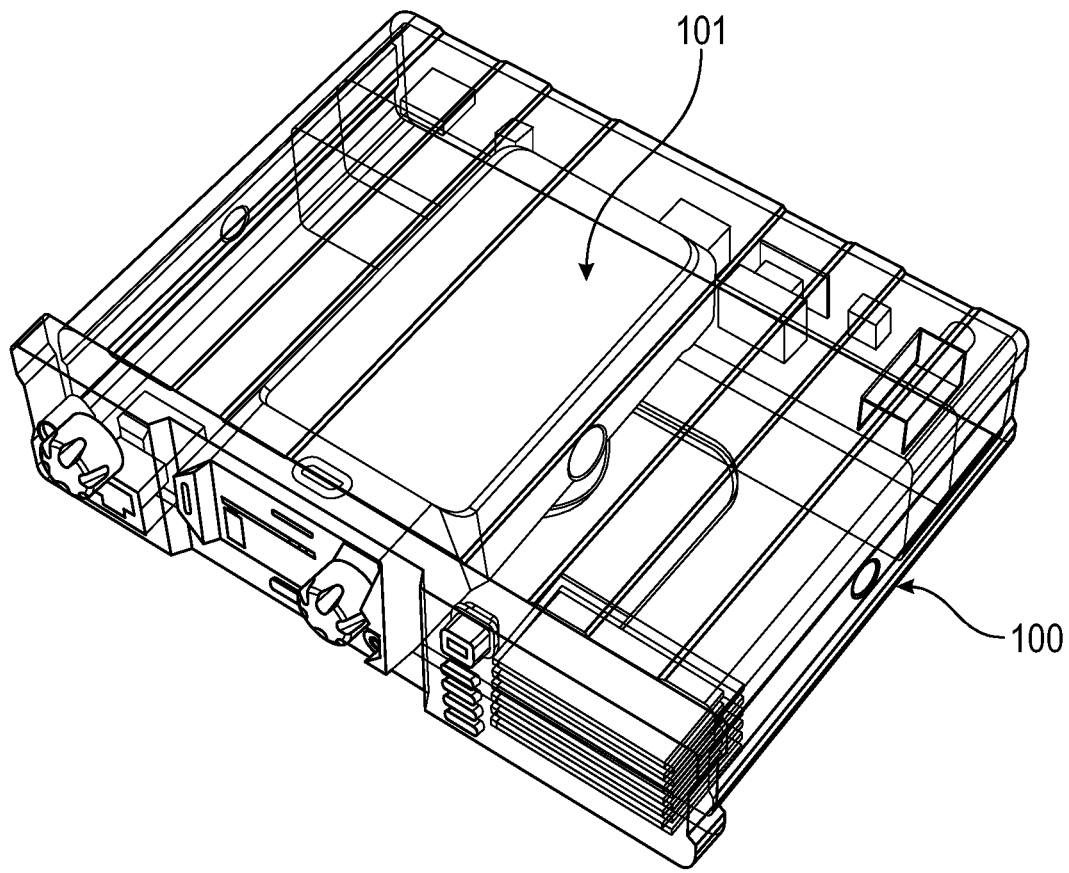
FIG. 4 is the conversion apparatus as shown in silhouette and revealing the PoC device incorporated therein.

With reference to FIG. 4, the relationship of the PoC device 101 within the conversion apparatus 100 is shown for one exemplary implementation of the present invention. Here, the conversion apparatus 100 is shown in silhouette and reveals the inner space in which the PoC device is incorporated horizontally in a manner similar to insertion of a cassette into a tape player. This exemplary arrangement provides advantageous ease of use to a user by quickly and easily inserting and removing the PoC device to/from its position within the conversion apparatus 100.

Figure 5:
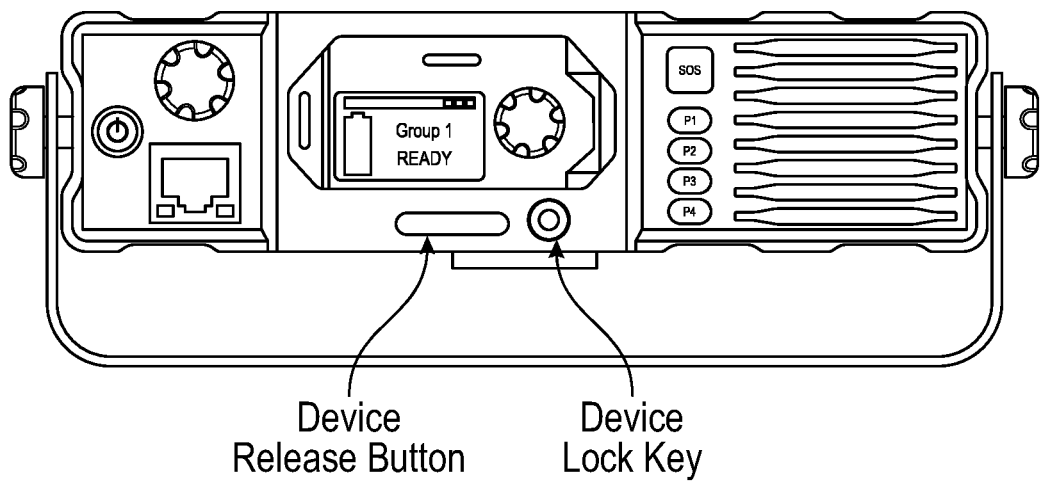
FIG. 5 is front view of the conversion apparatus as shown in FIG. 1.
Figure 6:
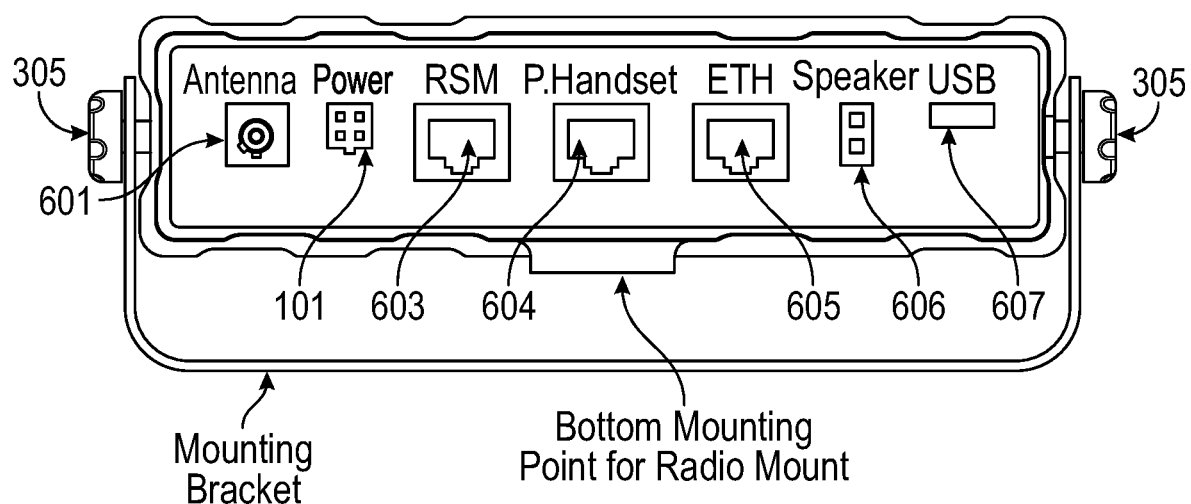
FIG. 6 is rear view of the conversion apparatus as shown in FIG. 1.
Figure 7:
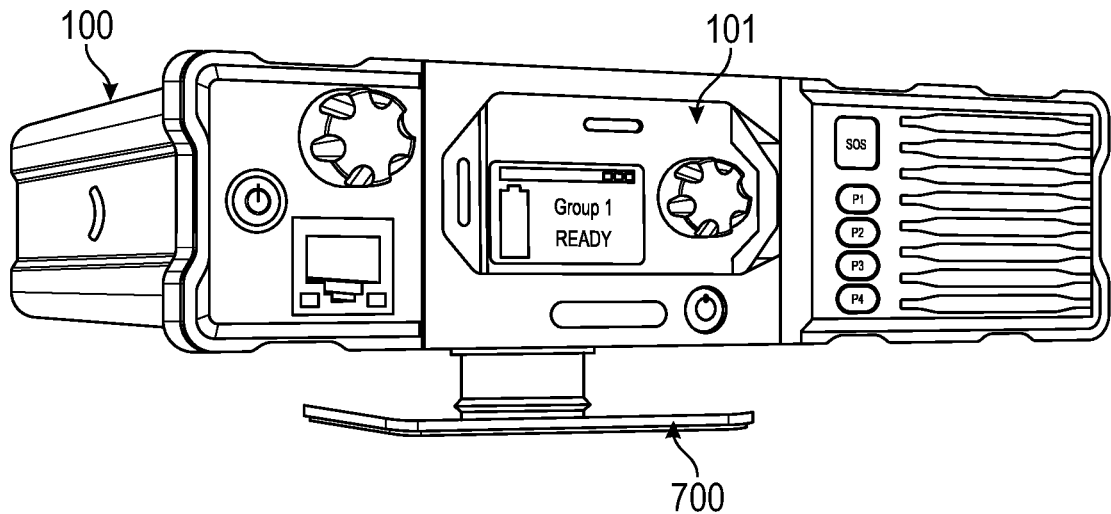
FIG. 7 is front perspective view of the conversion apparatus and utilizing a bottom mount configuration.
Figure 8:
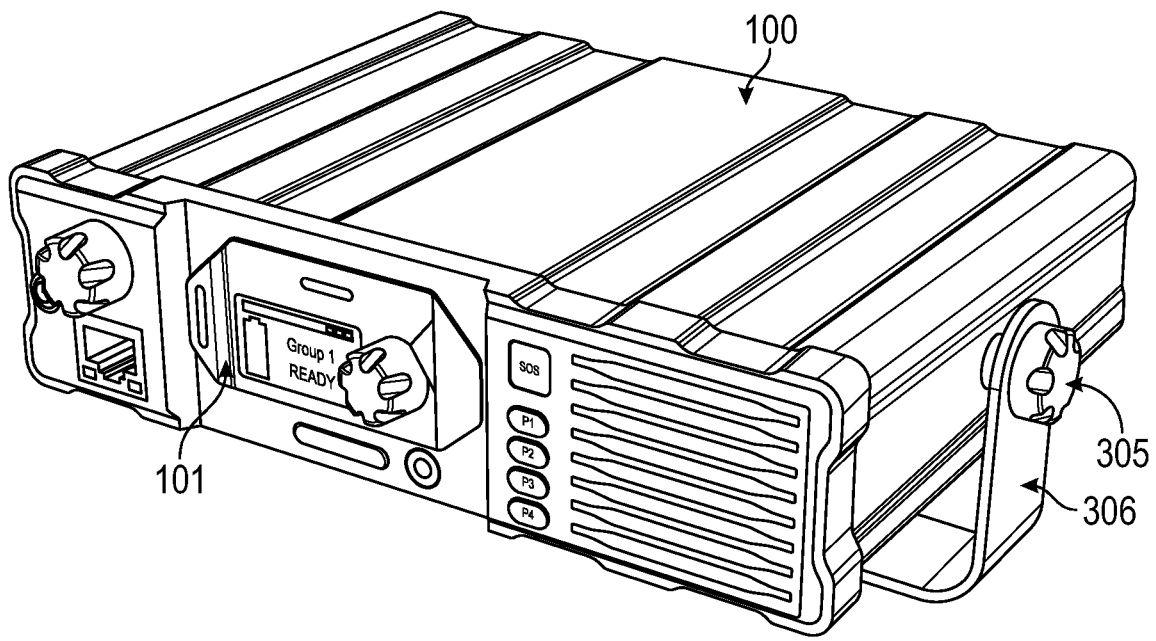
FIG. 8 is front perspective view of the conversion apparatus and utilizing a bracket mount configuration.

With reference to FIG. 5, a front view of the conversion apparatus is provided. Here, the two mounting tighteners are visible at either side of the conversion apparatus. Likewise, FIG. 6 is rear view of the conversion apparatus as shown in FIG. 1 and clearly shows ports 601 through 607 along with the two mounting tighteners 305. In FIG. 6, the bottom mounting point is also visible and represents an alternative mounting capability in lieu of a mounting bracket. Such a bottom mount configuration is shown in FIG. 7 and which includes a mounting base 700 instead of the mounting bracket. The mounting base 700 is used to secure the conversion apparatus 100 to a suitable surface in the user's vehicle. In contrast, FIG. 8 is front perspective view of the conversion apparatus 100 and illustrates a bracket mount configuration. In either a bottom mount or bracket mount configuration, it should be readily apparent that the brackets may be affixed to a vehicle surface by any manner including, but not limited to, screws, rivets, adhesives, magnets, or the like.

Figure 9:
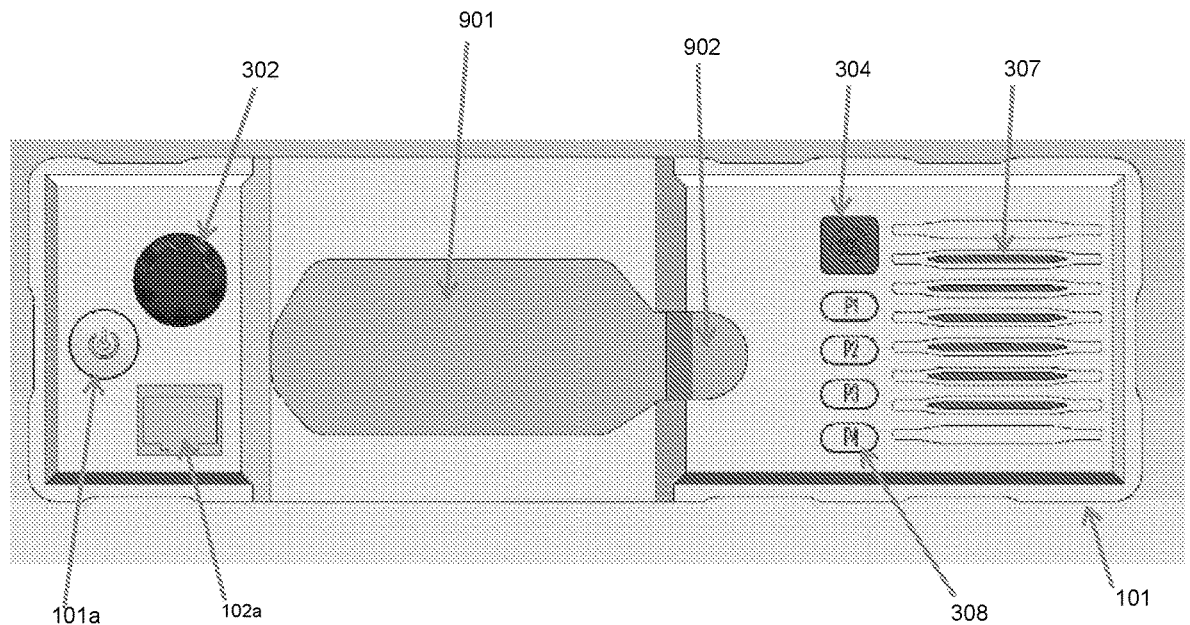
FIG. 9 is front view detail of a faceplate of the conversion apparatus.

With reference to FIG. 9, there is shown a front view detail of a simplified version of the faceplate of the conversion apparatus 101 in accordance with one implementation of the invention and without any PoC device inserted therein. Here, like-parts including power button 101, knob 302, SOS button 304, function keys 308 and speaker grill 307 are shown as previously described. In addition, the front facing RSM port 102a (analogous to rear RSM port 603) is shown which accommodates the external palm microphone (element 102 shown and described above with regard to FIG. 3). Two dust plates 901 and 902 are visible where the PoC device would normally be inserted. These dust plates are spring-loaded and retained in place to normally block the opening into which the PoC device is inserted thereby preventing dust and unwanted debris from entering the space otherwise occupied by the PoC device. As should be clear, the configuration illustrated in FIG. 9 is only one example and many other configurations and implementations are possible. As an example, while FIG. 9 illustrates the use of dust plates 901 and 902, in some configurations and implementations, such dust places may be omitted.

Figure 10:
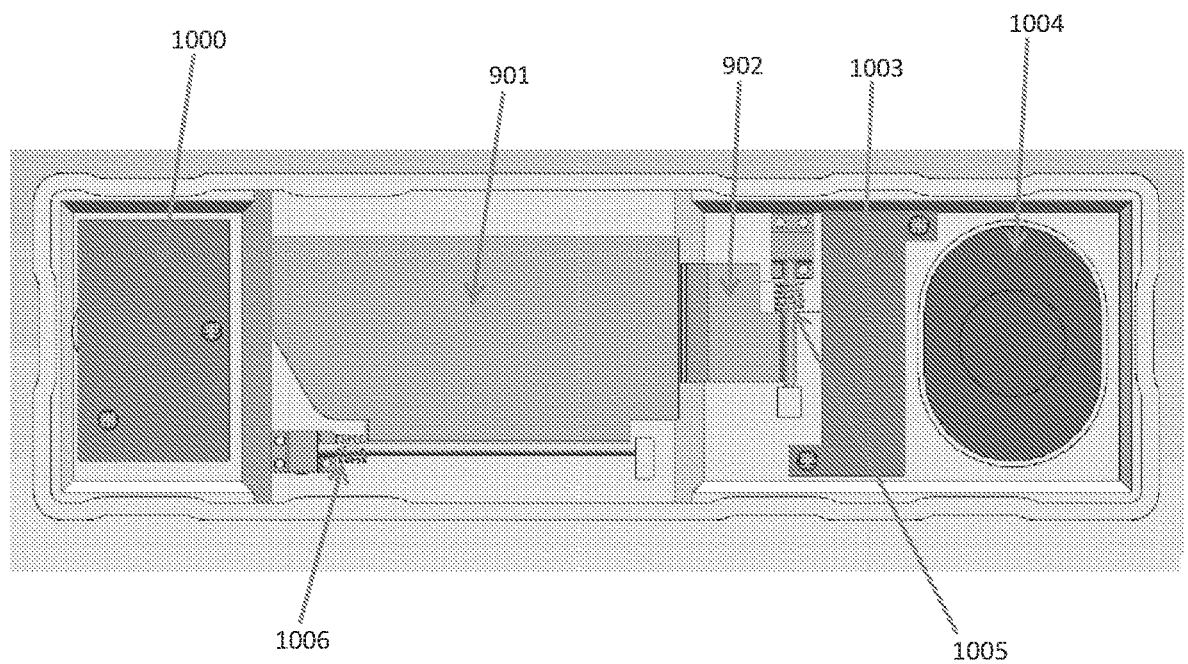
FIG. 10 is front view detail of the conversion apparatus with the faceplate removed.

With reference to FIG. 10, there is shown a front view detail similar to that of FIG. 9 but with the faceplate removed. Here, the two dust plates 901 and 902 are again visible though now in their entirety along with the springs 1006 and 1005 which hold, respectively, dust plates 901 and 902 in a normally closed position. Also visible are the printed circuit boards 1000 and 1003 which connect to the faceplate controls previously described with regard to FIG. 3. The internal speaker 1004 is also shown in place and is of a known type of speaker such as, but not limited to, a low-profile piezoelectric speaker. It should be understood that the specifics with regard to the printed circuit boards in terms of volume, power, channel selection and the like are well known in the electronics art and are outside the scope of the present invention, thus will not be further described herein. It should also be understood that the configuration illustrated in FIG. 10 is one specific implementation of the present invention. Other configurations are possible and are within the scope of the present document and of the present invention.

Figure 11:
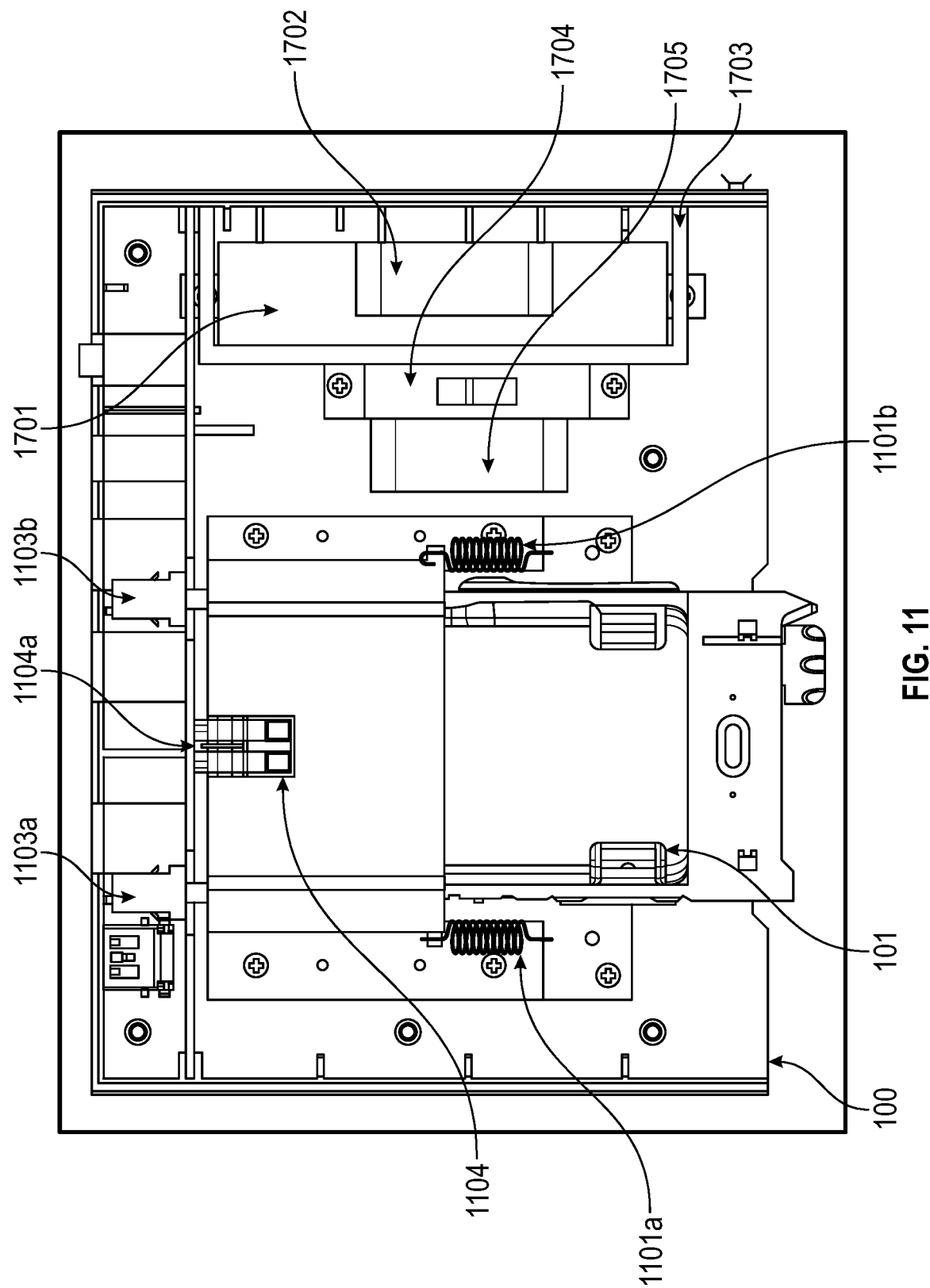
FIG. 11 is top internal view of the conversion apparatus revealing internal details thereof.
Figure 12:
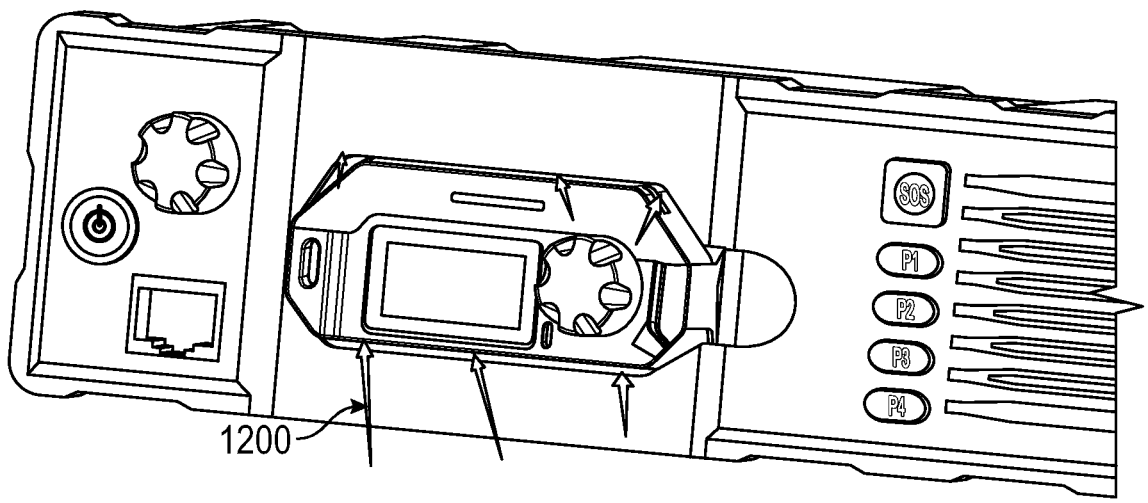
FIGS. 12 through 15 are various detailed views indicating air flow points located throughout the conversion apparatus.
Figure 13:
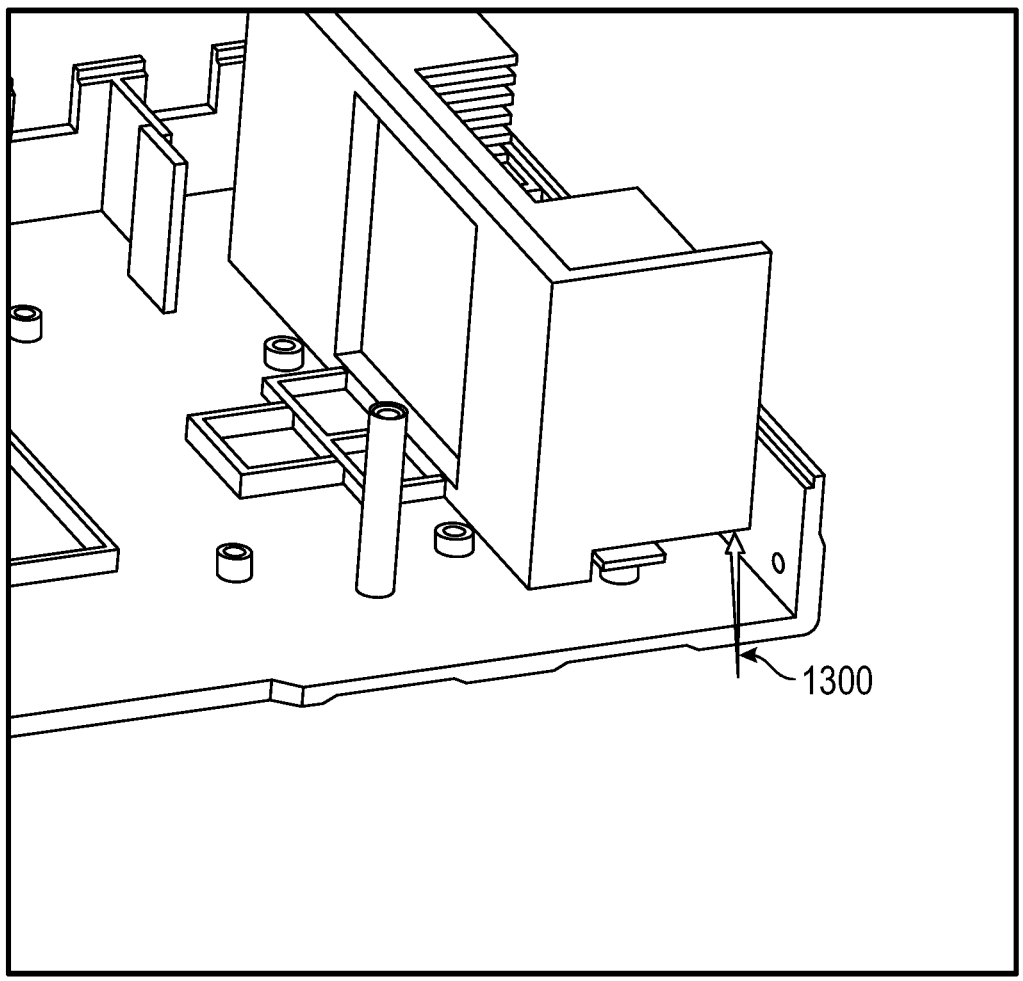

With reference to FIG. 11, there is shown a top internal schematic view of the conversion apparatus 100 with a PoC device 101 inserted therein. Here, the internal details are revealed including the ejection and the cooling mechanisms. As previously discussed, a user may eject the PoC device 101 from its position within the conversion apparatus 100 by using the eject button (element 310 shown in FIG. 3). When normally retained in place, the PoC device 101 will be connected to the conversion apparatus by internal connection points 1104 and 1104a. Stops (or bumpers) 1103a and 1103b assist in preventing unwanted bumping of the PoC device 101 against the rear of the conversion apparatus 100. Springs 1101a and 1101b are used to mechanically facilitate ejection of the PoC device upon user engagement of the eject button. It should be clear that internal connection point 1104 couples the PoC device to the conversion apparatus for charging while internal connection point 1104a is a USB-C type connection point that provides a data connection point between the PoC device and the conversion apparatus. It should also be clear that FIG. 11 shows elements useful in one embodiment of the sleeve and locking mechanism. An alternative locking mechanism will be explained further below.

With further reference to FIG. 11, a cooling mechanism according to another aspect of the present invention is shown. The cooling mechanism advantageously utilizes an active cooling system within the enclosure embodying the conversion device 100. The cooling system includes fans 1702 and 1705 along with a cooling guide block 1704. A thermoelectric cooling pad 1600 that cools one side and heats up another side is used. The cooling guide block 1704 sits on the cool side of the cooling pad 1600 and the cooling guide block 1704 receives hot air from within the enclosure and cools that hot air. The fan 1705 blows the cooled air from the cooling guide block 1704 into the enclosure. The thermoelectric cooling pad 1600 sits within a cutout area of a layer of ethylene-vinyl acetate (EVA) foam 1703 and the hot side of the cooling pad 1600 sits adjacent a heat sink 1701. The heat from the hot side of the cooling pad 1600 is absorbed by the heat sink 1701 and this heat sink 1701 is cooled by fan 1702. The air flow path utilized by the cooling system is shown by directional arrows 1200, 1300, 1400, and 1500 in FIGS. 12 through 15, respectively. It should also be noted that the exterior ports on the rear of the conversion device also serve as access points for airflow. In addition, the side of the enclosure housing the heat sink 1701 and the fan 1702 may also be provided with suitable ventilation ports to assist in airflow. Such ventilation ports would allow the fan 1702 to ingest outside air to be blown on to the heat sink 1701.

Figure 14:
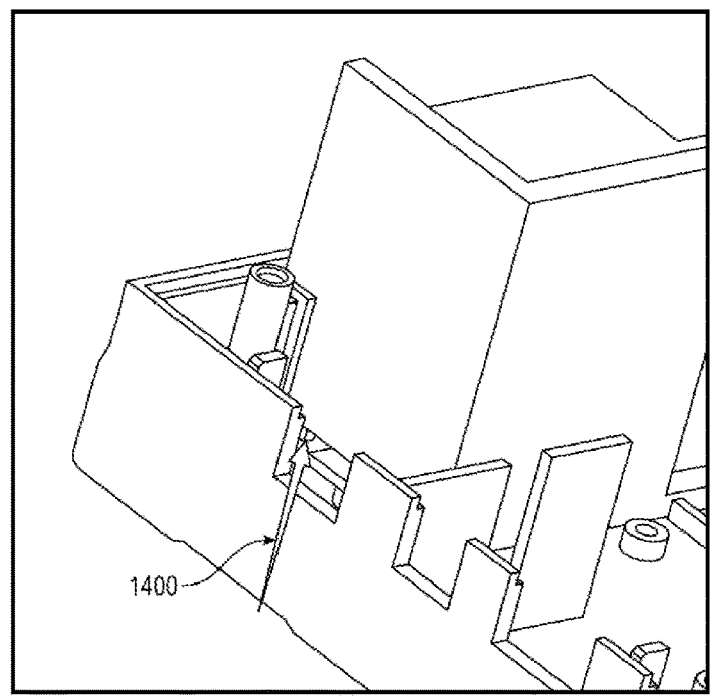
Figure 15:
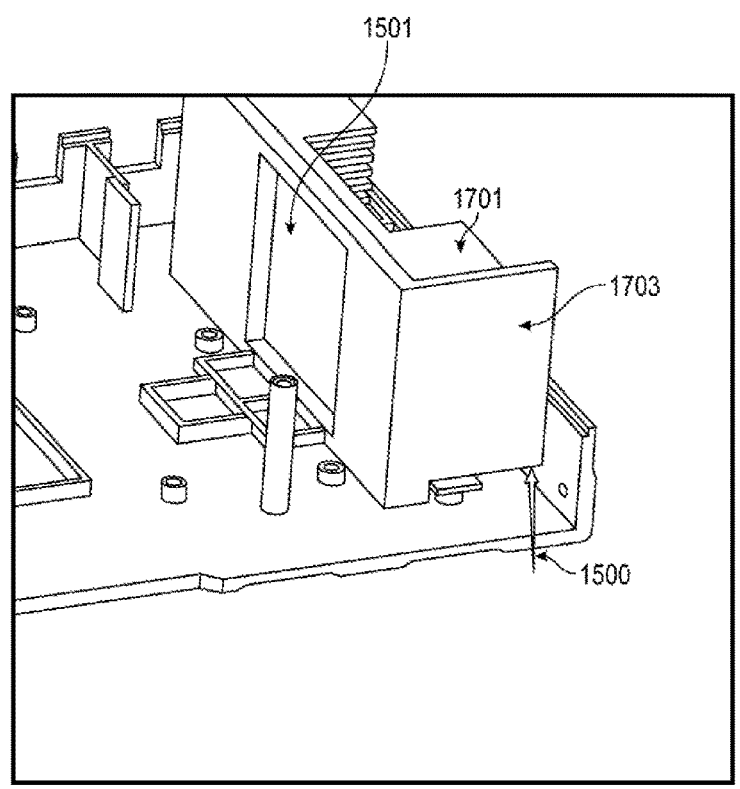
Figure 16:
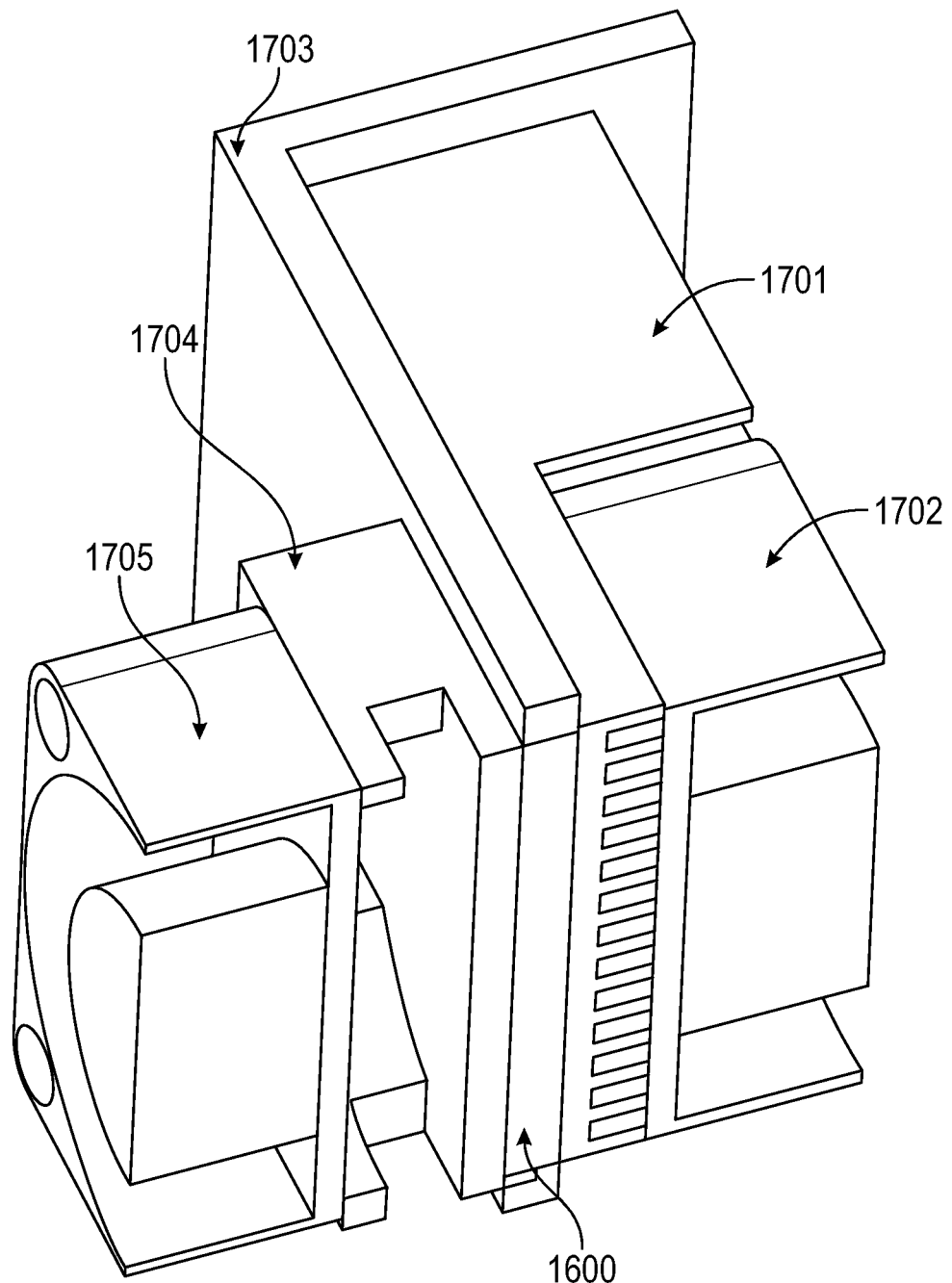
FIG. 16 is a perspective cut-away view of the cooling mechanism of the conversion apparatus.
Figure 17:
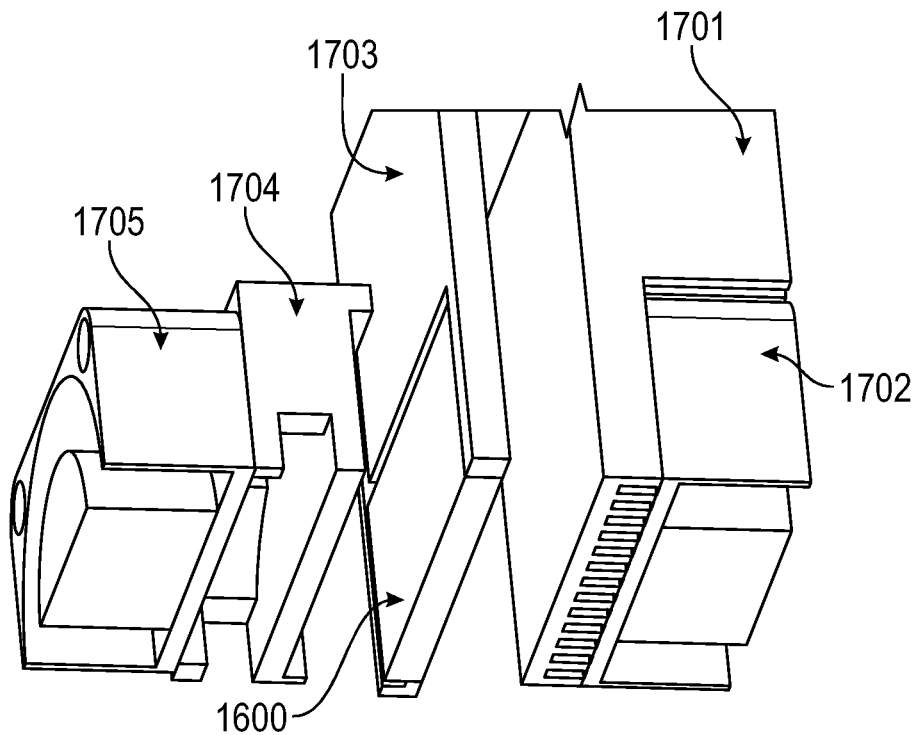
FIG. 17 is an expanded view of the cooling mechanism as shown in FIG. 16.
Figure 18:
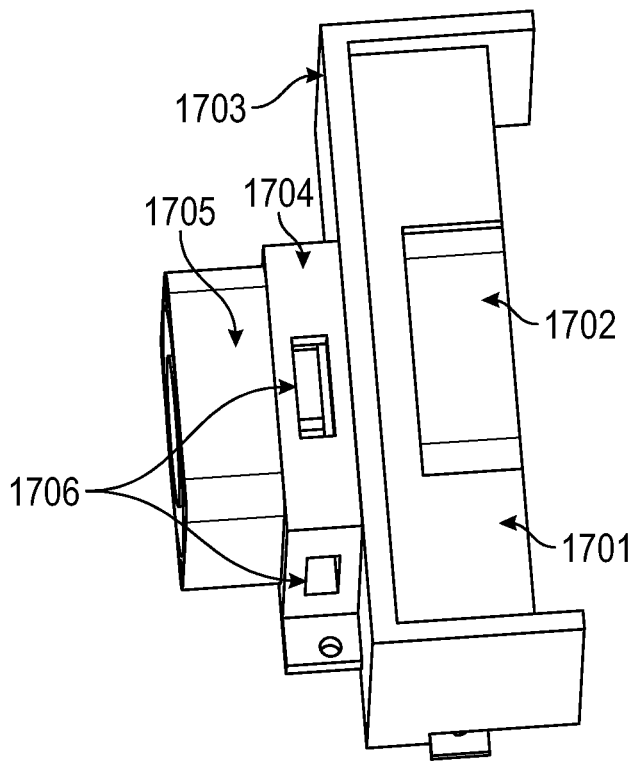
FIG. 18 is a top perspective view of an assembled cooling mechanism of the conversion apparatus in accordance with the present invention.

With specific reference to FIG. 15, the EVA foam 1703 is shown to include an airflow access point whereby the air flow path 1500 occurs. Likewise, the opposite side of the EVA foam as shown in FIG. 14 includes an airflow access point whereby the air flow path 1400 occurs. Both air flow paths 1400 and 1500 serve to allow air into the enclosure such that heat sink 1701 can be cooled by fan 1702. In FIG. 15, there is also shown a square space 1501 adjacent the heat sink 1701. The space 1501 is used to position the thermoelectric cooling pad 1600 as further shown with additional reference to FIGS. 16 and 17. The thermoelectric cooling pad 1600 abuts the heat sink 1701 and serves to actively transfer its elevated (i.e., hot side) temperature to the heat sink 1701 as further described below. Simultaneously, the fan 1705 channels airflow from the cooling guide block 1704 (which collects air via openings 1706 from within the enclosure) and this airflow is cooled and subsequently expelled by the fan 1705 back into the enclosure. By channeling cooled air back into the enclosure, the fan 1705 thereby cools the interior of the enclosure as well as the PoC device. With reference to FIG. 18, the cooling mechanism of the conversion apparatus is shown in its complete and assembled state. In this manner, the interior of the conversion apparatus is maintained at a temperature range sufficient to ensure proper operation of all electronics located therein including maintaining the PoC device. Preferably, interior electronics and circuitry control the functioning of the thermoelectric cooling pad 1600 such that the cooling pad is activated at a certain temperature and is shut down once another (lower) temperature is achieved.

It should be readily apparent that the EVA foam 1703 serves to provide as a divider between the hot and the cold sides of the thermoelectric cooling pad 1600. Thermoelectric cooling exhibited by the thermoelectric cooling pad 1600 may use the Peltier effect to create a heat flux at the junction of two different types of materials. Generally speaking, a Peltier cooler, heater, or thermoelectric heat pump is a solid-state active heat pump which transfers heat from one side of the device to the other, with consumption of electrical energy, depending on the direction of the current. Such an instrument is also called a Peltier device, Peltier heat pump, solid state refrigerator, or thermoelectric cooler (TEC) and occasionally a thermoelectric battery. It can be used either for heating or for cooling, although in terms of the present invention, the main application is cooling. The primary advantages of a Peltier cooler compared to a vapor-compression refrigerator are its lack of moving parts or circulating liquid, very long life, invulnerability to leaks, small size, and flexible shape. When operated as a cooler, a voltage is applied across the device, and as a result, a difference in temperature will build up between the two sides.

Effectively, the thermoelectric cooling pad 1600, in accordance with the present invention, functions when the current applied goes through the pad, and the pad will start lowering the temperature at one side, thus the other side will become hotter while the other side gets colder. In this manner, the EVA foam 1703 acts as a barrier between the hot side of the pad and the cool side. The heat sink 1701 absorbs the heat generated by the hot side of the cooling pad 1600 and the fan 1702 disperses this heat from the heat sink 1701. The cooling block guide 1704 receives hot air from within the enclosure and this hot air is cooled by the cold side of the thermoelectric cooling pad 1600. The cooling block guide 1704 has four openings (two visible as 1706) on its sides and thus enables air to be drawn in from within the interior of he enclosure. Warm air is cooled by the cooling block guide 1704 and the fan 1705 blows this cooled air back into the enclosure and on to the PoC device within the conversion apparatus. The mechanism thereby allows for a cooling of not just the PoC device but also of the conversion apparatus itself.

Figure 19:
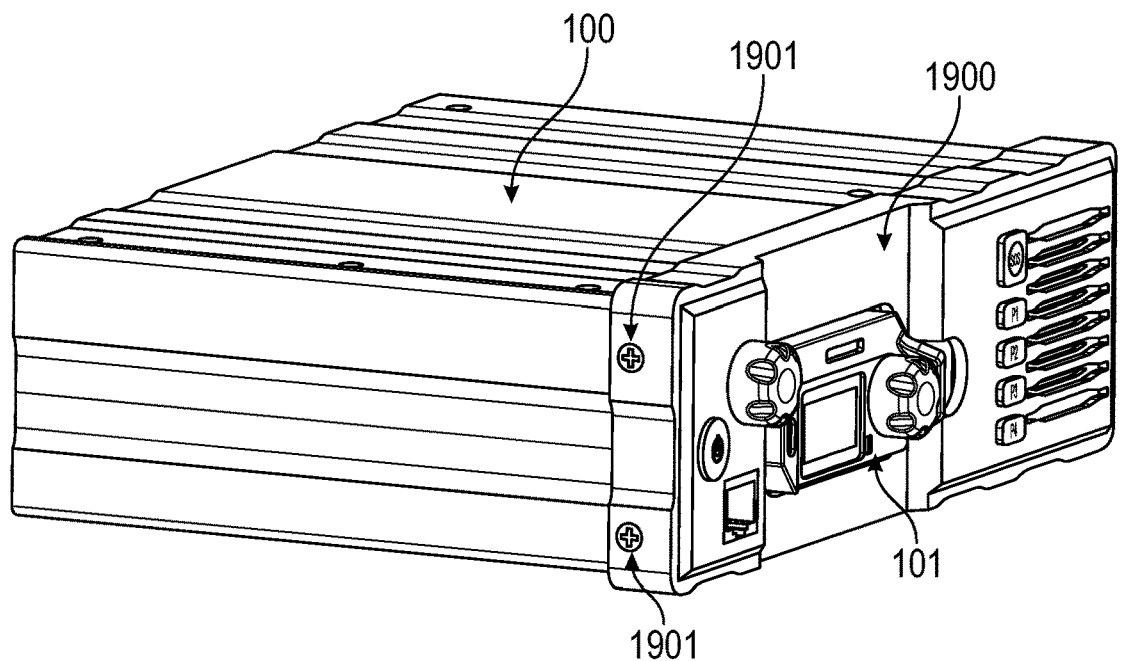
FIG. 19 is three-dimensional side view of the conversion apparatus in accordance with the present invention showing external fastener features.
Figure 20:
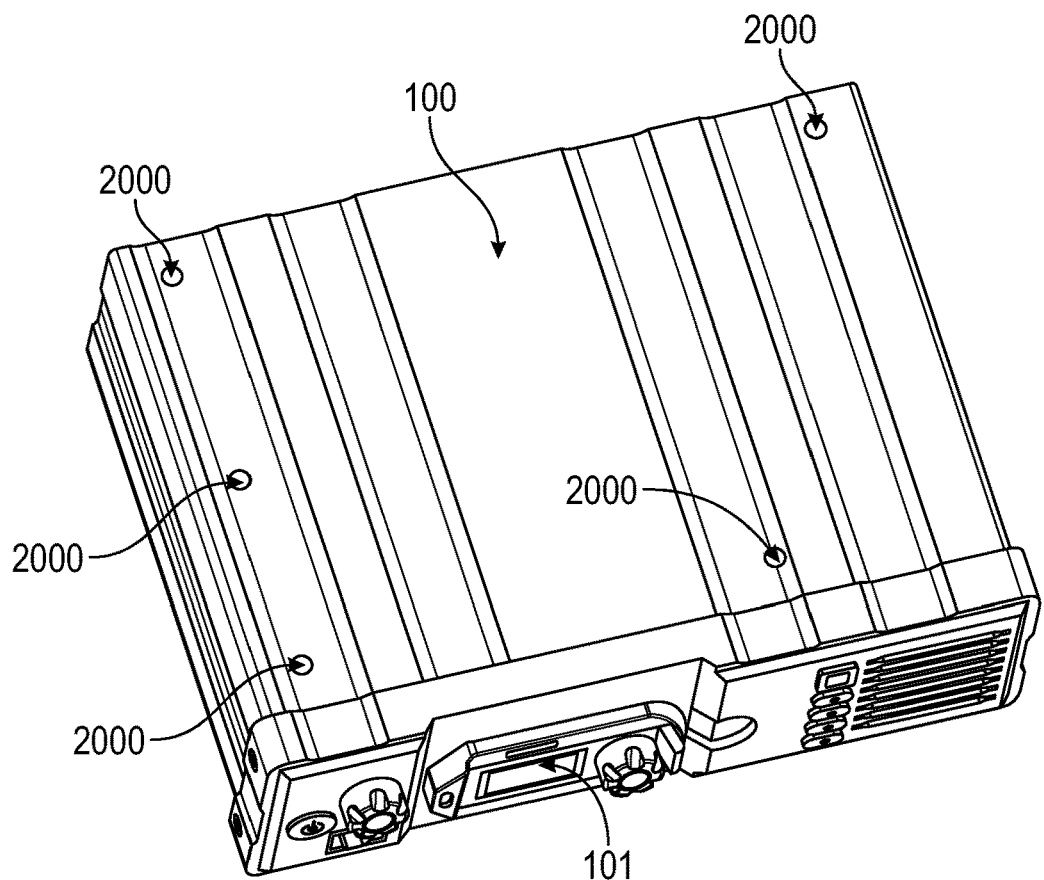
FIG. 20 is three-dimensional top view of the conversion apparatus in accordance with the present invention showing external fastener features.

With reference to FIG. 19, there is shown a three-dimensional side view of the conversion apparatus 100 in accordance with the present invention showing external fastener features in the form of screws 1901 which are used to attach the faceplate 1900 to the body of the conversion apparatus. It should be understood that two additional screws (not visible) are also present similarly on the other side of the faceplate 1900. FIG. 20 further shows external fastener features in the form of screws 2000 on the outer surface of the conversion apparatus 100. All such external fasteners are provided to integrate the conversion apparatus 100 into a unitary structure.

Figure 21:
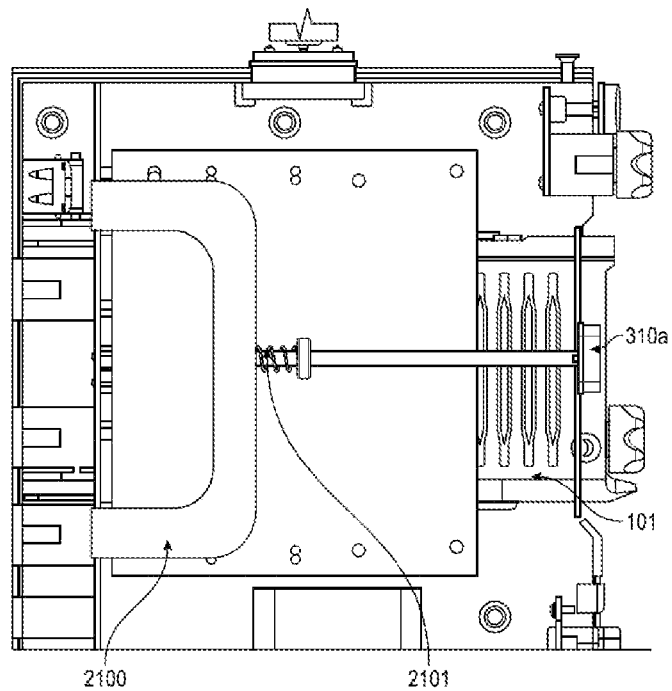
FIG. 21 through 24 illustrate one possible configuration of a latching mechanism related to insertion of the PoC device with the conversion apparatus in accordance with the present invention.
Figure 22:
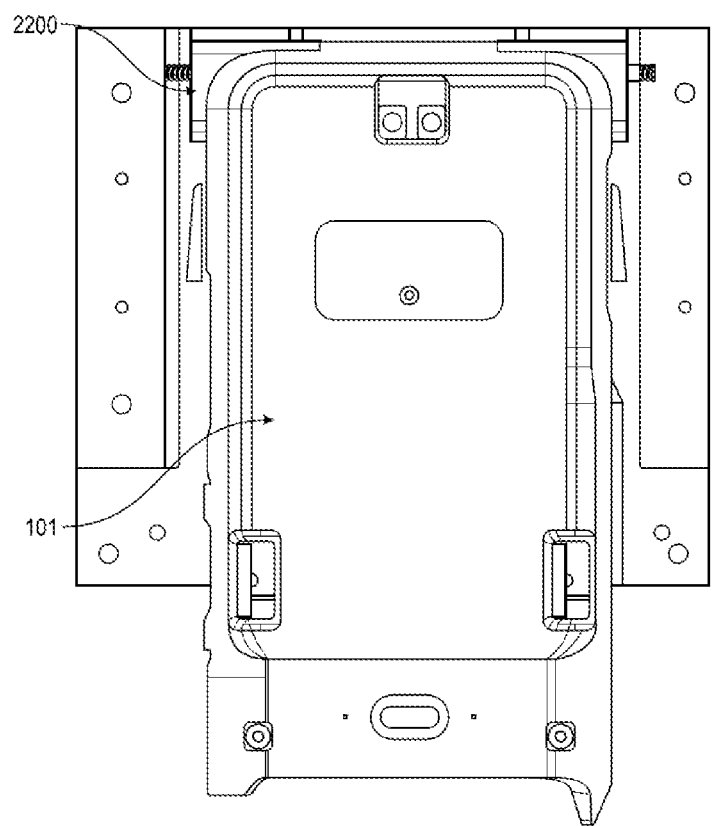
Figure 23:
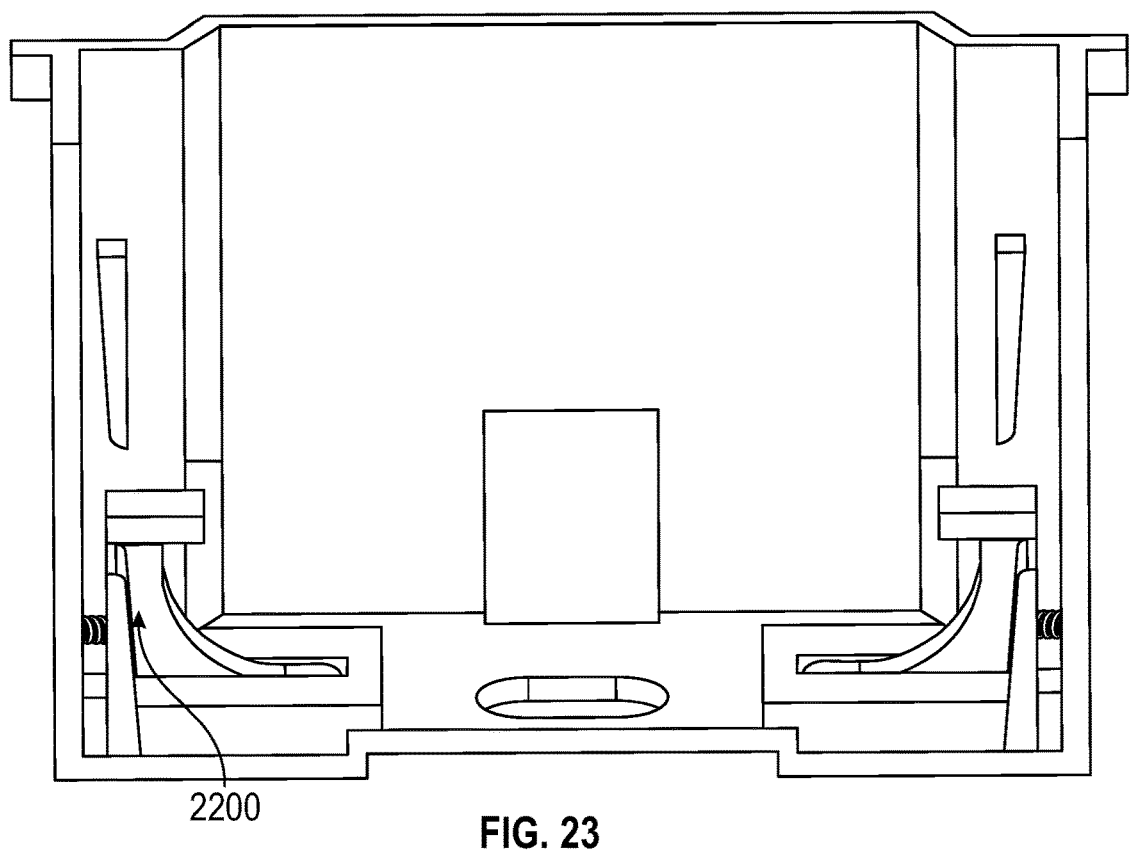
Figure 24:
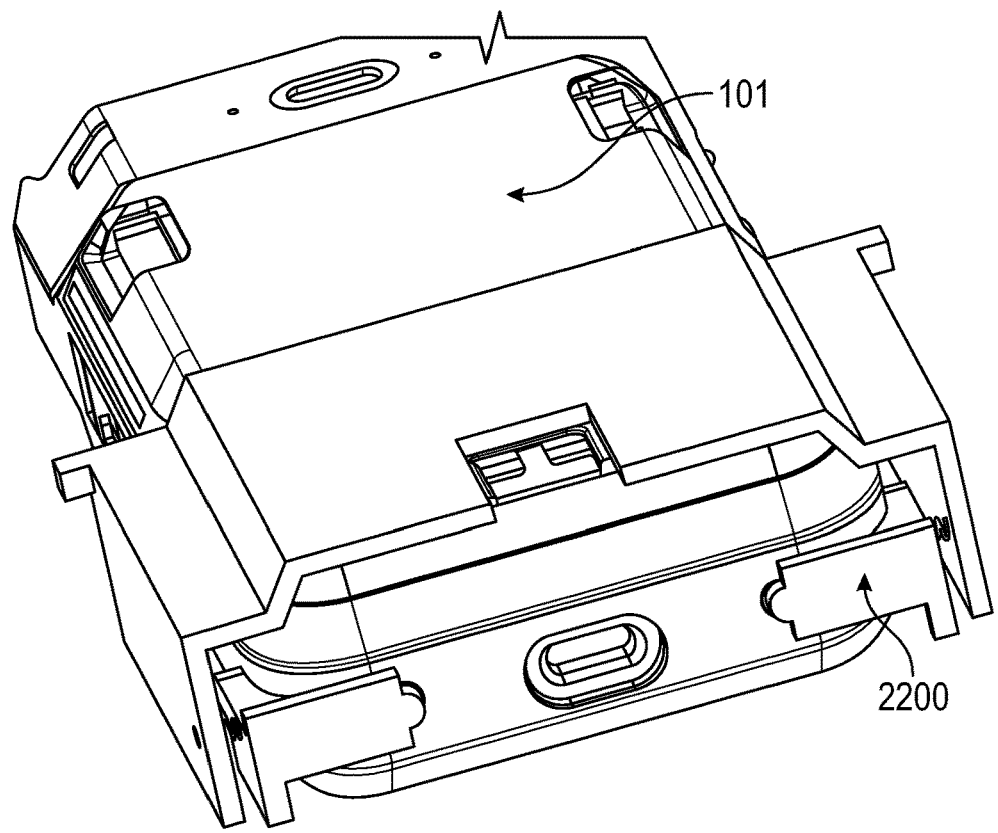

With reference to FIGS. 21 through 24 there is shown an alternative configuration of a latching mechanism related to the insertion of the PoC device within the conversion apparatus in accordance with the present invention. FIG. 21 shows a push button 310*a* similar to the above-mentioned release button 310. The push button 310*a* is held in a normally extended position by spring 2101. Depressing the push button 310*a* will cause element 2100 to engage with two lockers 2200 located at either side of the end of the PoC device 101. In a manner known to one of skill in the mechanical art, the PoC device 101 may include a guide slit on each side with a notch in the end of it. When the PoC device 101 is pushed into place, the lockers 2200 on each side will lock to those notches in the end of the PoC device 101. To release, a user may then press the push button 310*a* and this will release these lockers 2200 allowing the PoC device 101 to be pulled out. It should be readily apparent that any other suitable mechanical ejection scheme may be used to insert, retain, and release the PoC device without straying from the intended scope of the present invention. It should be clear that the latching mechanism shown and described in relation to FIGS. 21 to 23 would not use the springs 1101*a* and 1101*b* nor the bumpers 1103*a* and 1103*b*. For implementations using the configuration of the latching mechanism shown in FIGS. 21 to 23, the springs and bumpers noted above may be omitted. However, such springs and bumpers may be used by alternative latching mechanisms.

A person understanding this invention may now conceive of alternative structures and embodiments or variations of the above all of which are intended to fall within the scope of the invention as defined in the claims that follow.

We claim:

1. A conversion apparatus for receiving a cellular data device, said apparatus comprising:
an enclosure;
an opening within said enclosure, said opening configured to accept therein said cellular data device;
a plurality of ports for interfacing said cellular data device with at least one accessory; and
circuitry located within said enclosure and enabling said cellular data device to transfer data between a cellular network and at least one of said plurality of output ports, and
an active cooling mechanism for active temperature control, said active cooling mechanism being contained entirely within said enclosure, wherein said active cooling mechanism comprises a thermoelectric cooling pad, a heat sink for absorbing heat generated by said at least one thermoelectric cooling pad, at least two fans, and a cooling guide block adjacent said at least one thermoelectric cooling pad, wherein said at least two fans are spaced away from air inlets that are on an exterior wall of said enclosure such that said at least two fans draw air from within said enclosure, wherein a first one of said at least two fans cools said heat sink and wherein a second one of said at least two fans blows cool air from said cooling guide block into an interior of said enclosure, wherein said cooling guide block has openings to receive hot air from within said enclosure, said openings being located on at least two sides of said cooling guide block, and wherein said cooling guide block is positioned between said at least two fans.

2. The conversion apparatus as claimed in claim 1, wherein said plurality of ports includes a network interface port.

3. The conversion apparatus as claimed in claim 1, further including a conversion apparatus control knob providing a first function enabled by said circuitry, wherein said first function is one of either channel selection or volume selection.

4. The conversion apparatus as claimed in claim 3, wherein said circuitry enables a control of said cellular data device to provide a second function and said second function is one of either channel selection or volume selection.

5. The conversion apparatus as claimed in claim 4, wherein said first function and said second function are different from one another.

6. The conversion apparatus as claimed in claim 1, wherein said cellular data device is a push-to-talk over cellular (PoC) device having an electrical connection connectable to said circuitry.

7. The conversion apparatus as claimed in claim 6, wherein said electrical connection is a Universal Serial Bus Type-C (USB-C) connection.

8. The conversion apparatus according to claim 1, wherein said enclosure comprises ventilation ports to allow outside airflow to enter said enclosure, said outside airflow being used to cool at least a portion of said conversion apparatus.

9. The conversion apparatus according to claim 1, wherein said plurality of ports includes at least one of:
a network interface port;
an antenna port;
a power connection port;
a remote speaker connection port;
a privacy handset connection port;
a speaker port; and
a connection port.

10. The conversion apparatus according to claim 1, further comprising a latching mechanism to releasably latch said cellular data device within said enclosure.

11. The conversion apparatus according to claim 10, wherein said latching mechanism comprises bumpers and springs mounted within said enclosure.

12. The conversion apparatus according to claim 10, wherein said latching mechanism comprises at least one locker deployed within said enclosure, said at least one locker, when engaged, engages at least one notch on said cellular data device to thereby latch said cellular data device within said enclosure.

* * * * *